United States Patent [19]

Corini

[11] 3,733,836

[45] May 22, 1973

[54] TEMPERATURE CONTROLLED MOBILE CART

[75] Inventor: Louis J. Corini, Philadelphia, Pa.

[73] Assignee: Melbro Corporation, Philadelphia, Pa.

[22] Filed: Jan. 17, 1972

[21] Appl. No.: 218,356

[52] U.S. Cl. ....................62/3, 62/414

[51] Int. Cl. ....................F25d 17/06

[58] Field of Search ....................62/3, 414

[56] References Cited

UNITED STATES PATENTS

| | | | |
|---|---|---|---|
| 2,442,719 | 6/1948 | Booth | 62/414 |
| 2,601,765 | 7/1952 | Turquette | 62/414 |
| 2,973,627 | 3/1961 | Lackey | 62/3 |
| 2,991,628 | 7/1961 | Tuck | 62/3 |
| 3,138,934 | 6/1964 | Roane | 62/3 |
| 3,177,671 | 4/1965 | Stambaugh | 62/3 |
| 3,194,024 | 7/1965 | Bassett | 62/3 |
| 3,315,474 | 4/1967 | Farer | 62/3 |

*Primary Examiner*—William J. Wye
*Attorney*—Henry N. Paul, Jr. et al.

[57] ABSTRACT

A mobile cart is provided with thermoelectric cooling means actuated by a circuit which provides for either external A. C. current input or integral D. C. current power supply. A cabinet is specially constructed to pass air through a finned heat sink for heat transfer purposes and through the controlled temperature container portion of the cart.

1 Claim, 4 Drawing Figures

Patented May 22, 1973 3,733,836

3 Sheets-Sheet 2

TEMPERATURE CONTROLLED MOBILE CART

CROSS REFERENCE TO RELATED APPLICATION

Reference is made to my prior copending application for a Portable Reverse Temperature Controlled Container, Ser. No. 216,149, filed Jan. 1, 1972, the disclosure of which is incorporated herein by reference.

BACKGROUND OF THE INVENTION

This invention relates to a mobile cart of the type designed to reduce and maintain temperature within given parameters while transferring and storing matter, and in particular, to a cart which utilizes principles of thermoelectrics to achieve controlled cooling and which is designed to work with either normal A. C. 115 volt externally applied current or D. C. current supplied by a battery on the cart.

In certain types of work, such as the transfer of matter in a pharmaceutical manufacturing plant or laboratory, it is desirable to maintain the matter at controlled temperatures, both while it is being transported, say for example, down a hallway from one room to another, and while it is being stored, say for example, at a stationary location.

The principles of thermoelectrics in providing temperature control are discussed in my prior copending application (reference above) and the patents referred to therein. Thermoelectric modules provide an excellent means of temperature control for the present application.

Mobile transfer carts for hot foods are currently used in hospitals. However to my knowledge none of them provide the cooling means, air flow distribution, and flexibility in electrical power input provided by my invention. In particular it is desirable to provide a mobile cart with its own source of D. C. power to activate the thermoelectric modules, which D. C. power is always maintained up to strength automatically, and to provide means for utilizing a separate external source of A. C. power.

SUMMARY OF THE INVENTION

The present invention provides a means for achieving the desirable ends noted above and comprises an insulated, mobile cart having one or more thermoelectric modules mounted to heat transfer blocks attached to the inner shell of the cart, which shell is spaced from the lining forming the container portion of the cart. A fan is provided to circulate air between the inner shell and the liner and through the container. The thermoelectric modules are also mounted to finned heat transfer means which are positioned in a specially designed frame in the chest which cooperates with a frame surrounding a fan to blow air through the finned means and out through the outer shell of the cart. The thermoelectric means is actuated by a circuit having means to operate from either an integrally mounted D. C. current source or 115 volt A. C. external current source.

Accordingly, it is an object of my invention to provide a new and novel mobile cart of the type described. This and other objects of my invention will become apparent from the following description with reference to the accompanying drawings.

DESCRIPTION OF THE PREFERRED EMBODIMENTS

Figure 1:
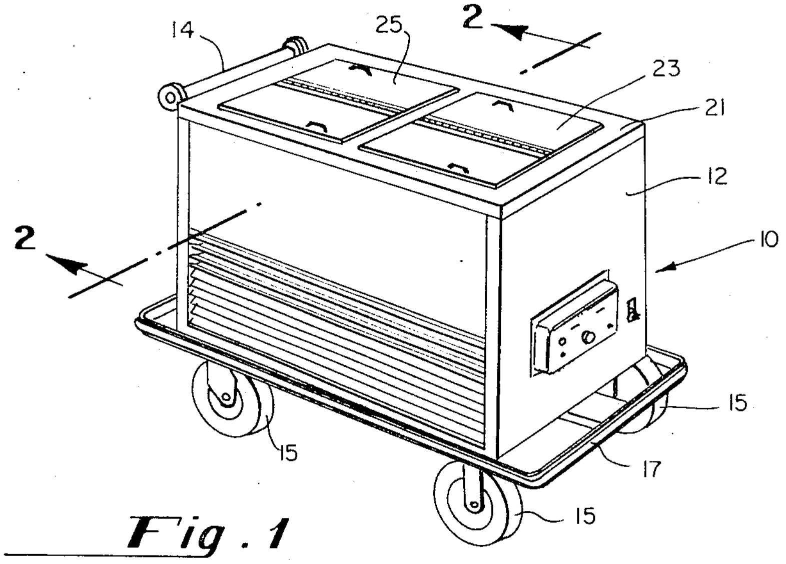
FIG. 1 is a perspective view taken from the left front side of a cart in accordance with the preferred embodiment of my invention.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures the mobile cart is designated generally 10 and consists of an overall outer shell 12 made of a light weight sheet material, such as steel, onto which a handle 14 has been attached. The shell 12 is mounted on a base 13 which is supported by wheels 15 and includes a rubber bumper 17 and a foot stop 19 all of which are well known in the art of mobile transfer carts. The upper deck 21 of the shell is provided with a plurality of openings having a plurality of hinged insulated lids 23, 25 therein; such lids being well known in the art. The inner shell 16 of the cart is made of a light weight sheet material. The shells are positioned in assembled condition and then an insulating material 18, such as polyurethane, is poured into the hollow formed between shells and allowed to expand and solidify in order to hold the parts in their relative positions.

Figure 3:
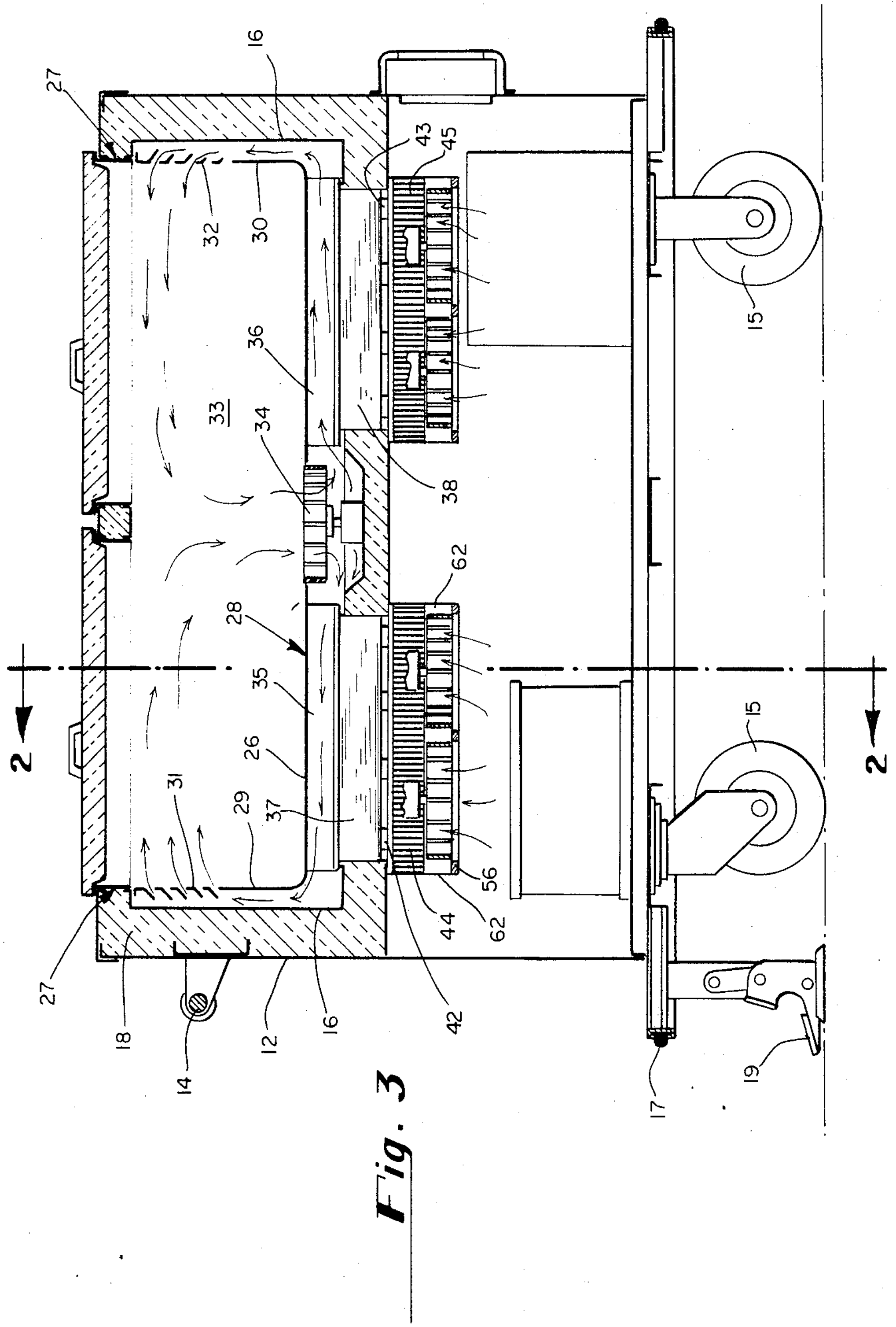
FIG. 3 is a section taken as indicated by the lines and arrows 3—3 in FIG. 2.

The inner liner 26 forming the container portion is fixedly connected in any suitable manner at its outer periphery to the inwardly depending portions of the combined outer and inner shells as at 27 FIG. 3, and thus is suspended in spaced relation to the inner shell 16 and forms an air shroud. The entire liner comprises a flat bottom portion 28 with upwardly extending oppositely disposed portions 29 and 30 each of which are vented by the louvers 31 and 32 respectively, and has flat wall portions, such as 33 extending upwardly between the oppositely disposed louvered portions to form the side walls. In the bottom portion 28 provision is made to insert a fan 34 which in operation draws air from within the container as shown by the arrows. This air is circulated through finned heat transfer means 35, 36 which comprise a flat plate and a plurality of upwardly extending flat fins equally spaced in parallel planes. These finned heat transfer means are positioned against the bottom of the bottom portion 28 of the liner.

Figure 2:
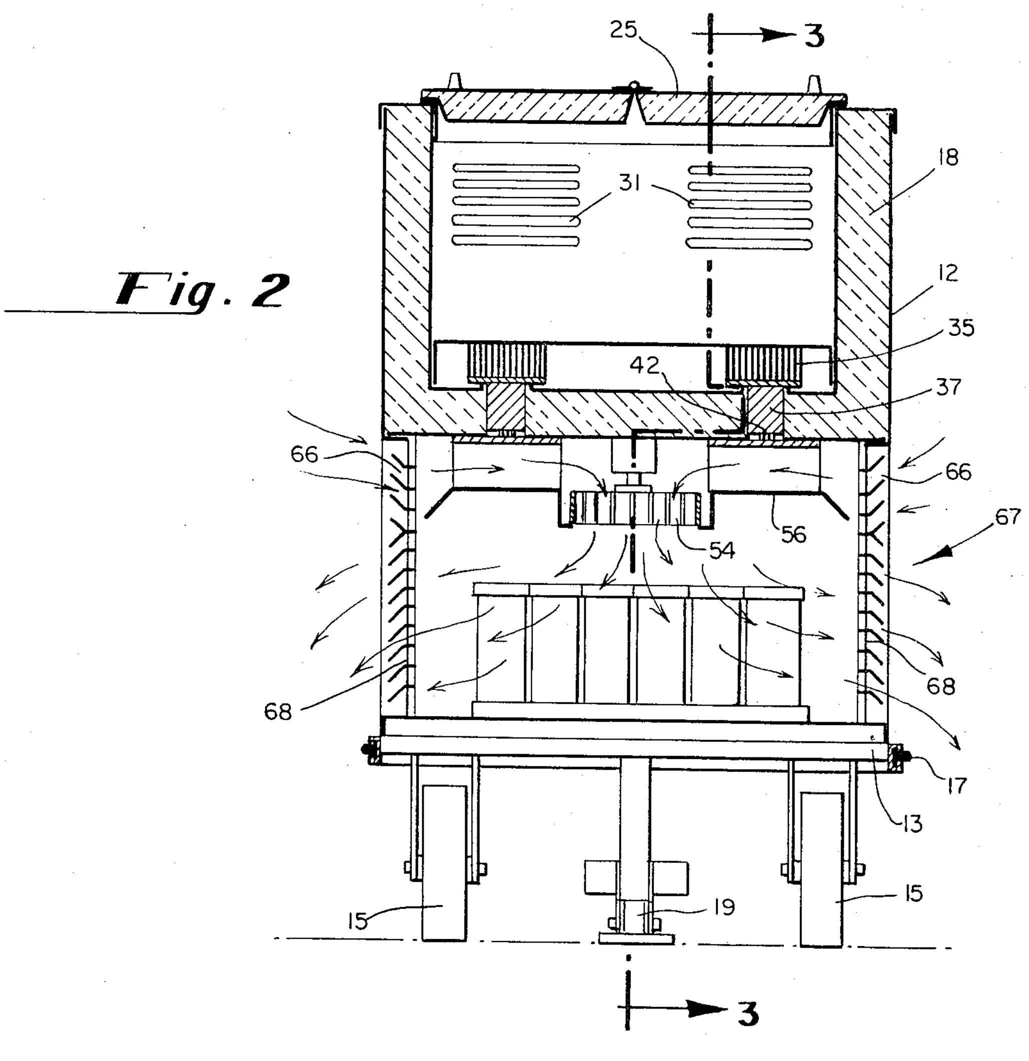
FIG. 2 is a section taken as indicated by the lines and arrows 2—2 in FIG. 1.

Mounted on the other side of each of these finned heat transfer means is a cold shoe which comprises most preferably an aluminum block 37, 38 respectively. It will be noted most particularly from FIGS. 2 and 3 hat the inner shell, insulation and other parts previously described are so positioned with respect to one another that a channel is formed through which the air is circulated from the container, through the finned heat transfer means, up between the end walls 29 and 30 and the inner shell 16, and through the louvers 31 and 32, thus providing constant heat transfer and heat circulation within the container.

Mounted below and to the aluminum blocks 37, 38 in any suitable manner allowing for heat transfer therebetween are one or more thermoelectric modules 42, 43. These modules are adequately described in U.S. Pat. No. 3,445,039 and, as stated therein, possess numerous advantages over mechanical refrigeration. One of these advantages is that there are no moving parts necessary in order to obtain cooling or heating. The basic theory behind the thermoelectric module is that the passage of electric current through a metallic thermocouple results in a transfer in heat from one metal to the other.

To aid in this heat transfer process I have provided plurality of finned heat sinks 44, 45 similar to those previously described.

For refrigeration, D. C. current is passed through the thermoelectric module which draws Btu's from the cold shoe and the finned heat sink mounted above it and dissipates them on the finned heat sink mounted below it. To aid in this dissipation, I have provided a fan 54 which sucks air in and blows it across the fins to remove the Btu's. In order to make this operation more efficient, I have provided an air ventura 56 which envelops the downwardly depending heat sinks. The sides 62 FIG. 3 are flat and extend upwardly beyond the outer fins of the heat sink and embrace these fins, as shown, so as to make the air channel completely enclosed and immediately adjoining the heat sink. Air, therefore, passes as shown by the arrows directly from the outside, through the upper louvers 66 of the base (designated generally 67), through the heat sinks, and out through the lower louvers 68. In doing so it removes Btu's from the fins.

It will be understood that for heating, the D. C. current polarity can be reversed by providing circuitry similar to that disclosed in my prior copending application referenced above, and Btu's can be drawn from the lower finned heat sinks and pumped into the fins of the upper heat sinks through the cold shoes. In that case the fans still operate in order to keep supplying air to the fins of the heat sinks, and to distribute the heat in the container. I shall now describe the electrical elements and circuitry necessary to achieve the desirable ends of my invention.

Figure 4:
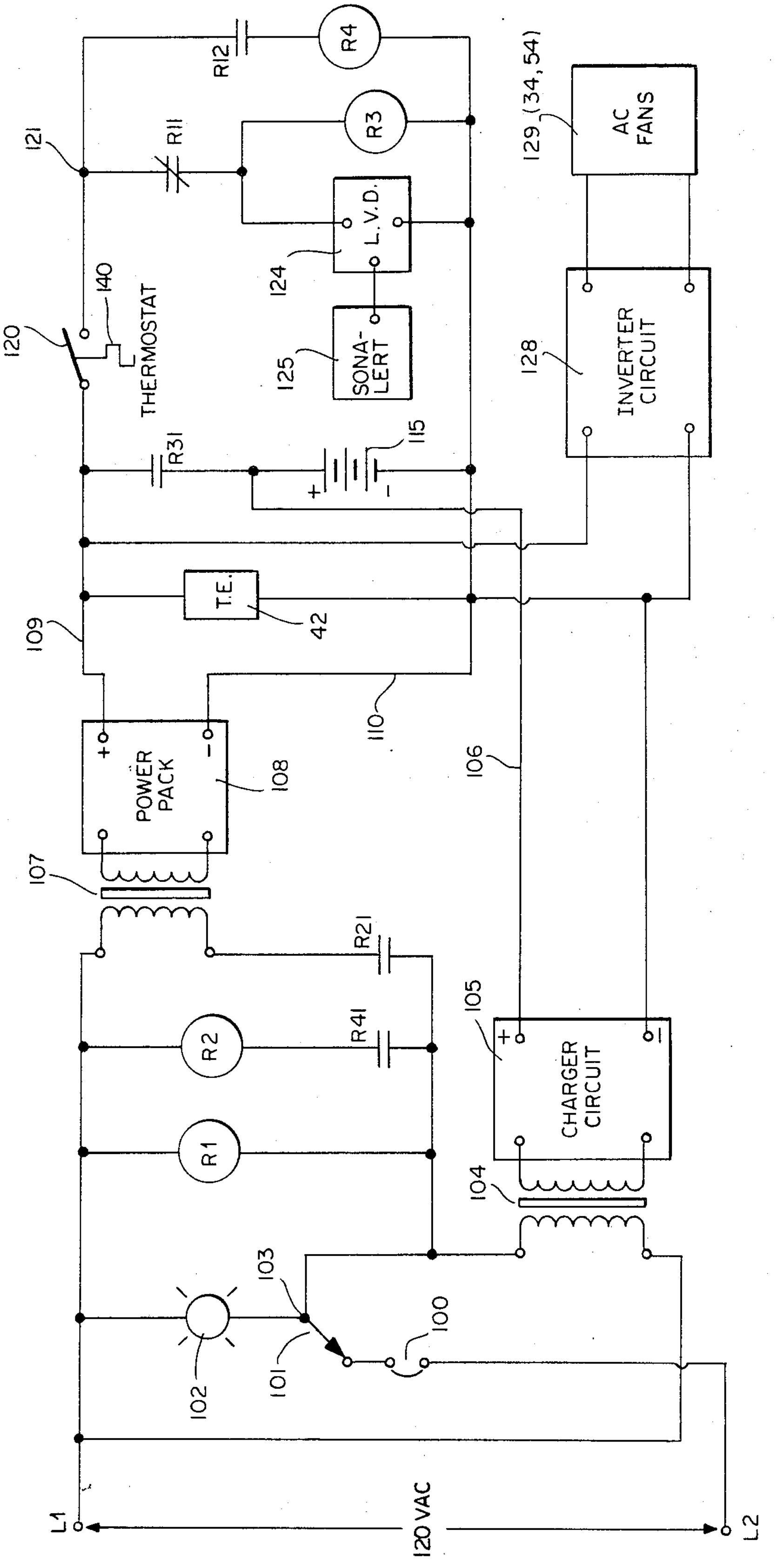
FIG. 4 is a schematic diagram of the electrical circuit of this invention with certain elements shown in block form.

Referring now to FIG. 4, the A. C. power plug (not shown) connects to lines L1 and L2, providing 120 volts A. C. to the unit. Connected between these lines is the series combination of contact 100 (which is closed when the A. C. plus is in and is open when the A. C. plug is out), manually operated ON-OFF switch 101, and bulb 102 which indicates when A. C. power is available. One terminal of switch 101, designated 103, is connected to a first terminal of the primary winding of transformer 104, the other terminal of such winding being connected to line L1, so that the 120 volts A. C. is connected across the primary when switch 100 is closed. The secondary of transformer 104 is connected to charger circuit 105. Transformer 104 has a turns ratio designed to step down the voltage to a level suitable for charging a nominally 24 volt battery. Charger circuit 105 is a conventional circuit providing rectification of the AC input and including a silicon controlled rectifier having its gate connected to a reference potential source, suitably a zener diode, and having its output connected to the terminals of battery 115. The reference potential is suitably chosen at the desired maximum battery charging level, so that as long as the battery is below such maximum the SCR is controlled to pass a high charging current. The SCR also provides protection, since it turns off when the battery voltage reaches a predetermined maximum, or limit level. This type of battery charger is well known in the art, and need not be described in further detail to provide a complete understanding of this invention.

Relay R1 is connected between L1 and terminal 101, and is shunted by a second relay R2 in series with normally open contact R41. Also connected between L1 and terminal 101 is the primary winding of transformer 107 in series with normally open contact R21. Thus, when the A. C. plug is in and contact 100 is closed, relay R1 is energized; R2 is energized when R41 (activated by relay R4) is closed; and voltage is connected to transformer 107 when R21 (activated by relay R2) is closed. The secondary winding of transformer 107 is connected to a conventional power pack 108, which provides rectification and filtering to produce a D. C. voltage at its output terminals. The positive and negative output terminals of pack 108 are connected to bus lines 109 and 110 respectively. The thermoelectric module (or modules) 42 is connected directly between lines 109 and 110, such that it receives D. C. power at all times that a voltage appears across the output terminals of power pack 108. Also connected between lines 109 and 110 is battery 115 in series with normally open relay switch R31. As noted before, the terminals of battery 115 are connected to the charger circuit, such that the battery is automatically charged when the A. C. plug is in and switch 100 is closed. Line 109 is also connected to the positive input terminal of inverter circuit 128, the negative input terminal of which is connected to line 110. Inverter circuit 128 is a conventional oscillator-type circuit, suitably containing two active devices arranged to oscillate at about 60 cycles, and having an output transformer to provide 60 cycle voltage at approximately 115 volts, which is connected to A. C. fans 129.

Bus line 109 is connected to a first terminal of switch 120 operated by temperature control thermostat 140. Thermostat 140 is operatively connected to the inner liner 26, so as to monitor the temperature within the container, and may be set to the predetermined temperature which is to be maintained. The second terminal of switch 120 is connected to terminal 121, which in turn is connected to negative bus 110 through two paths. The first path comprises relay R4 (which operates switch R41) in series with normally open switch R12, which switch is operated by relay R1. The second path comprises normally closed switch R11 (operated by relay R1) in series with relay R3 (which operates switch R31). Connected across relay R3 is low voltage detector 124, which is designed to monitor the battery voltage and energize a sonalert device 125 whenever the battery voltage falls below a predetermined level. For example, for a 24 volt battery, detector 124 is designed to produce an output whenever the battery voltage drops to or below 15 volts. Detector 124 is a conventional unit well known in the art, the details of which are not necessary to an understanding of this invention.

In practice, when the plug is connected to A. C., so that switch 101 is in its closed position, 120 volts is impressed across light 102 indicating that A. C. power is available. Power is connected to charger circuit 105 which produces a D. C. output connected to battery 115 as long as the voltage of such battery is below the limit level of circuit 105. Relay R1 is energized, and for conditions where thermostat switch 120 is closed, switch R11 is caused to open, thus de-energizing R3, the low voltage detector and the sonalert. At the same time, relay switch R12 is closed, resulting in energization of relay R4 and closing of switch R41. With switch R41 closed, relay R2 is energized, switch R21 is closed, and A. C. power is impressed across the primary of transformer 107. Under these circumstances, the D. C. output of power pack 108 is impressed directly across thermoelectric module 42. Since switch R31 is open, battery 115 is disconnected from module 42 which draws all of its power from power pack 108.

When the A. C. plug is withdrawn and no A. C. power appears across lines L1 and L2, relay R1 is de-energized, resulting in the closing of switch R11 and energization of relay R3 and detector 124. Switch R31 is consequently closed, connecting the plus terminal of battery 115 to bus 109, and impressing the voltage of battery 115 directly across the thermoelectric module. At the same time, the low voltage detector circuit 124 is in operation and, upon detection of a battery drop to a predetermined limit, e.g., 15 volts, produces an output signal connected to sonalert 125, to alert anyone nearby to the need for charging the battery. The circuit is thus designed so that the low voltage detector and sonalert operate only when the system is being battery driven. Further, whenever the switch 120 is open, such that no additional cooling is called for, no power (A. C. or D. C.) is delivered to module 42.

In the above discussion of the preferred embodiment of this invention, the thermoelectric module has been described solely as providing cooling for the container. As is well known in the art, and described in my copending application, Ser. No. 216,149, the module or modules may be utilized for heating by reversing the polarity of the voltage applied to same. This may be accomplished by the simple expedient of a reverse polarity switch, also as shown in application Ser. No. 216,149.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide nonlegal technical statement of the contents of the disclosure in compliance with the Rules of Practice of the United States Patent Office, and is not intended to limit the scope of the invention described and claimed herein.

What is claimed:

1. A temperature controlled mobile cart adapted to provide controlled cooling within its interior, comprising:

a. an insulated shell having an inner liner therein forming a container spaced therefrom to form an air passage;

b. a first heat sink means within said air passage;

c. fan means to circulate air through said container, air passage, and first heat sink means;

d. cold shoe means comprising a separate block of heat conductive material having a first portion mounted in heat transfer relation to said first heat sink means;

e. thermoelectric module means, having a first portion mounted in heat transfer relation to a second portion of said block of material;

f. a second heat sink means mounted in heat transfer relation to a second portion of said module means;

g. air flow means, having a fan for producing air flow and forming a channel which envelops said second heat sink means and directs air flow therethrough;

h. integral D.C. power supply means, for providing a source of D.C. voltage to said thermoelectric means;

i. A.C. input means adapted to connect to an external source of A.C. power;

j. power converter means, connected to said A.C. input means, for converting A.C. to D.C. power, and having a D.C. voltage output connected to said thermoelectric module means;

k. thermostat means for monitoring the temperature of said cart interior;

l. switching means, having a switch operated by said thermostat means for maintaining D.C. voltage across said thermoelectric means when said cart interior is to be cooled and removing D.C. voltage from said module means when the temperature of said cart interior is below a predetermined temperature, and operative to hold said D.C. power supply voltage disconnected from said module means when said A.C. input means is connected to an external source of A.C. power;

m. a charger circuit connected to said A.C. input means and providing a controlled D.C. voltage connected to said D.C. power supply means;

n. an inverter circuit connected to the output of said converter means, for inverting D.C. power to A.C. power, and having an A.C. output con-nected to said fan means; and o. a low voltage detector means operatively connected to said battery when said A.C. input means is disconnected from said A.C. external source, and having an output connected to an audio alarm, for detecting when said battery voltage has dropped below a predetermined minimum and energizing said alarm.

* * * * *